United States Patent
Desai et al.

(10) Patent No.: US 11,595,835 B2
(45) Date of Patent: Feb. 28, 2023

(54) SERVICE COGNIZANT RADIO ROLE ASSIGNMENTS

(71) Applicant: Cisco Technology, Inc., San Jose, CA (US)

(72) Inventors: Vishal Satyendra Desai, San Jose, CA (US); Jerome Henry, Pittsboro, NC (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/235,413

(22) Filed: Apr. 20, 2021

(65) Prior Publication Data
US 2022/0338028 A1    Oct. 20, 2022

(51) Int. Cl.
*H04W 24/02* (2009.01)
*H04W 8/22* (2009.01)
*H04W 4/029* (2018.01)
*H04W 84/22* (2009.01)

(52) U.S. Cl.
CPC ........... *H04W 24/02* (2013.01); *H04W 4/029* (2018.02); *H04W 8/22* (2013.01); *H04W 84/22* (2013.01)

(58) Field of Classification Search
CPC ....... H04W 24/02; H04W 4/029; H04W 8/22; H04W 84/22
USPC ........................................................ 455/524
See application file for complete search history.

(56) References Cited

U.S. PATENT DOCUMENTS

| | | | |
|---|---|---|---|
| 9,810,767 B1* | 11/2017 | Hamilton | G01S 5/14 |
| 10,123,214 B2* | 11/2018 | Egner | H04W 48/10 |
| 10,469,993 B2* | 11/2019 | Arunachalam | H04W 4/90 |
| 10,488,910 B1* | 11/2019 | Cannell | H04W 4/20 |
| 10,685,326 B1* | 6/2020 | Ewing | G06Q 10/0875 |
| 11,105,917 B1* | 8/2021 | Bloechl | H04W 84/20 |
| 2004/0032363 A1* | 2/2004 | Schantz | G01S 11/06 342/146 |
| 2005/0046608 A1* | 3/2005 | Schantz | G01S 11/06 342/146 |
| 2006/0267833 A1* | 11/2006 | Langford | G01S 5/02524 342/174 |
| 2009/0042561 A1* | 2/2009 | Jackson | H04W 24/08 455/426.1 |

(Continued)

FOREIGN PATENT DOCUMENTS

| | | | | |
|---|---|---|---|---|
| EP | 3996425 A1 * | 5/2022 | | H04W 4/80 |
| WO | 2018208045 A2 | 11/2018 | | |

(Continued)

OTHER PUBLICATIONS

International Search Report and Written Opinion issued in International Application No. PCT/US2022/025114, dated Aug. 2, 2022 (16 pages).

*Primary Examiner* — Hai V Nguyen
(74) *Attorney, Agent, or Firm* — Merchant & Gould P.C.

(57) ABSTRACT

Service cognizant radio role assignments may be provided. A computing device may receive a beacon message associated with a tag. Then, based on information derived from the beacon message, an optimum radio in a network may be determined to monitor the tag. The optimum radio may be associated with an Access Point (AP) comprising one of a plurality of APs in the network. The optimum radio associated with the AP in the network may then be provisioned to monitor the tag.

20 Claims, 4 Drawing Sheets

(56) References Cited

U.S. PATENT DOCUMENTS

| | | | |
|---|---|---|---|
| 2010/0071572 A1* | 3/2010 | Carroll | B30B 9/3007 |
| | | | 100/229 A |
| 2010/0176434 A1* | 7/2010 | Ma | H01L 29/42336 |
| | | | 438/257 |
| 2010/0201520 A1* | 8/2010 | Stern | G01S 13/878 |
| | | | 340/572.1 |
| 2011/0176434 A1 | 7/2011 | Pandey et al. | |
| 2012/0026992 A1* | 2/2012 | Navda | H04W 4/60 |
| | | | 370/338 |
| 2013/0149960 A1* | 6/2013 | Dec | H04B 5/0081 |
| | | | 455/41.1 |
| 2014/0118113 A1* | 5/2014 | Kaushik | G01S 5/0231 |
| | | | 340/8.1 |
| 2015/0156567 A1* | 6/2015 | Oliver | G08B 21/0227 |
| | | | 340/870.07 |
| 2015/0168543 A1* | 6/2015 | Tian | G01S 1/68 |
| | | | 342/458 |
| 2016/0026837 A1* | 1/2016 | Good | G16H 40/20 |
| | | | 340/539.13 |
| 2016/0051191 A1* | 2/2016 | Miller | A61B 5/681 |
| | | | 600/300 |
| 2017/0213057 A1* | 7/2017 | Primm | H04W 4/80 |
| 2017/0215038 A1* | 7/2017 | Primm | H04L 5/14 |
| 2018/0067200 A1* | 3/2018 | Cook | G08B 25/08 |
| 2018/0077546 A1* | 3/2018 | Arunachalam | H04W 4/38 |
| 2018/0090992 A1* | 3/2018 | Shrivastava | H02J 50/20 |
| 2018/0167825 A1* | 6/2018 | Egner | H04W 48/10 |
| 2018/0184330 A1* | 6/2018 | Egner | H04L 43/0876 |
| 2018/0293478 A1* | 10/2018 | Cannell | G06K 19/0723 |
| 2018/0295466 A1* | 10/2018 | Cannell | H04W 40/244 |
| 2018/0356492 A1* | 12/2018 | Hamilton | G01S 13/76 |
| 2018/0376284 A1* | 12/2018 | Soro | H04W 4/02 |
| 2019/0124475 A1* | 4/2019 | Swart | H04W 4/029 |
| 2020/0089303 A1 | 3/2020 | Cannell et al. | |
| 2020/0162882 A1* | 5/2020 | Siraj | H04W 4/50 |
| 2020/0259237 A1* | 8/2020 | Shrivastava | G02F 1/163 |
| 2021/0013992 A1* | 1/2021 | Chuang | H04W 80/02 |
| 2021/0076222 A1* | 3/2021 | Malinen | H04W 16/14 |
| 2021/0345985 A1* | 11/2021 | Cunningham | G16H 40/63 |
| 2021/0350271 A1* | 11/2021 | Ross | G06N 20/00 |
| 2021/0384764 A1* | 12/2021 | Shrivastava | H02J 50/20 |
| 2022/0104300 A1* | 3/2022 | Ramachandra | H04W 52/36 |

FOREIGN PATENT DOCUMENTS

| | | | | |
|---|---|---|---|---|
| WO | 2018208046 A2 | 11/2018 | | |
| WO | WO-2020234902 A1 * | 11/2020 | | G06N 20/00 |

* cited by examiner

SERVICE COGNIZANT RADIO ROLE ASSIGNMENTS

TECHNICAL FIELD

The present disclosure relates generally to determining radio role assignments.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Service cognizant radio role assignments may be provided. A computing device may receive a beacon message associated with a tag. Then, based on information derived from the beacon message, an optimum radio in a network may be determined to monitor the tag. The optimum radio may be associated with an Access Point (AP) comprising one of a plurality of APs in the network. The optimum radio associated with the AP in the network may then be provisioned to monitor the tag.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Tags (e.g., Real-Time Location Service (RTLS) tags) may comprise Wi-Fi asset tags that may be responsible for multiple applications. As part of their RTLS service, these tags may provide various functions such as asset status, motion sensing, chokepoint detection, etc. Tags may rely, for example, on standard 2.4 GHz wireless infrastructure for communication and making deployments fast and easy. One purpose of these tags may be to determine a location of mobile equipment that the tag is attached to. These tags may rely on a beaconing process for communication and may not associate as wireless stations to Access Points (APs). This may help ensure improvement in a tag's battery life and may help provide a scalable solution for large retailers, warehouses, or enterprise customers.

In order to cater to the needs of these tags, APs may support monitoring functions. This may be achieved by either dedicated monitoring (e.g., by converting an AP to monitor mode) or using dual band (XOR) radios that change their operating role to monitor mode. Tags may be supported by Tags Optimized Monitor Mode (TOMM) that may allow the user to configure a set of channels (e.g., manually) for tag monitoring. Users may manually select, for example, up to four channels to monitor tags. While this mode/role of operation may ensure that beaconing from these wireless tags may be guaranteed to be received, it may also result in a waste of radio resources for the following two reasons for example. First, tags may primarily communicate on the 2.4 GHz spectrum with ~85 mW transmission power budget, therefore their message, initiated at the lowest data rate, may have a much larger reach than the simple scope of the closest APs. Second, TOMM may be done on a subset of the 2.4 GHz frequencies (e.g., a TOMM AP may navigate between the monitored channels, whereas most tag beacons may be on the universal 2.4 GHz frequencies 1, 6 and 11). In order to save battery life, some tag variants may send a beacon burst on a specific frequency only. But even then, the result may be that customers implement multiple APs with radios dedicated to monitoring full time a channel or a set of channels, just to capture an infrequent (e.g., every 5 minute) tag message, wasting resources (i.e., the radio may be unused for 99.99% of the time).

Embodiments of the disclosure may include a process that may influence radio role determination based on automatic discovery of tags in a network. For example, embodiments of the disclosure may determine an optimal set of radios that may monitor tags based on their beaconing characteristics, set of frequencies of operation, and their beacon range for example. In other words, consistent with embodiments of the disclosure, candidate radios may be selected from which to identify sets of radios that may optimally adhere and conform to monitoring requirements for tags based on their beaconing characteristics and range without comprising on client coverage impact on a given site.

Figure 1:
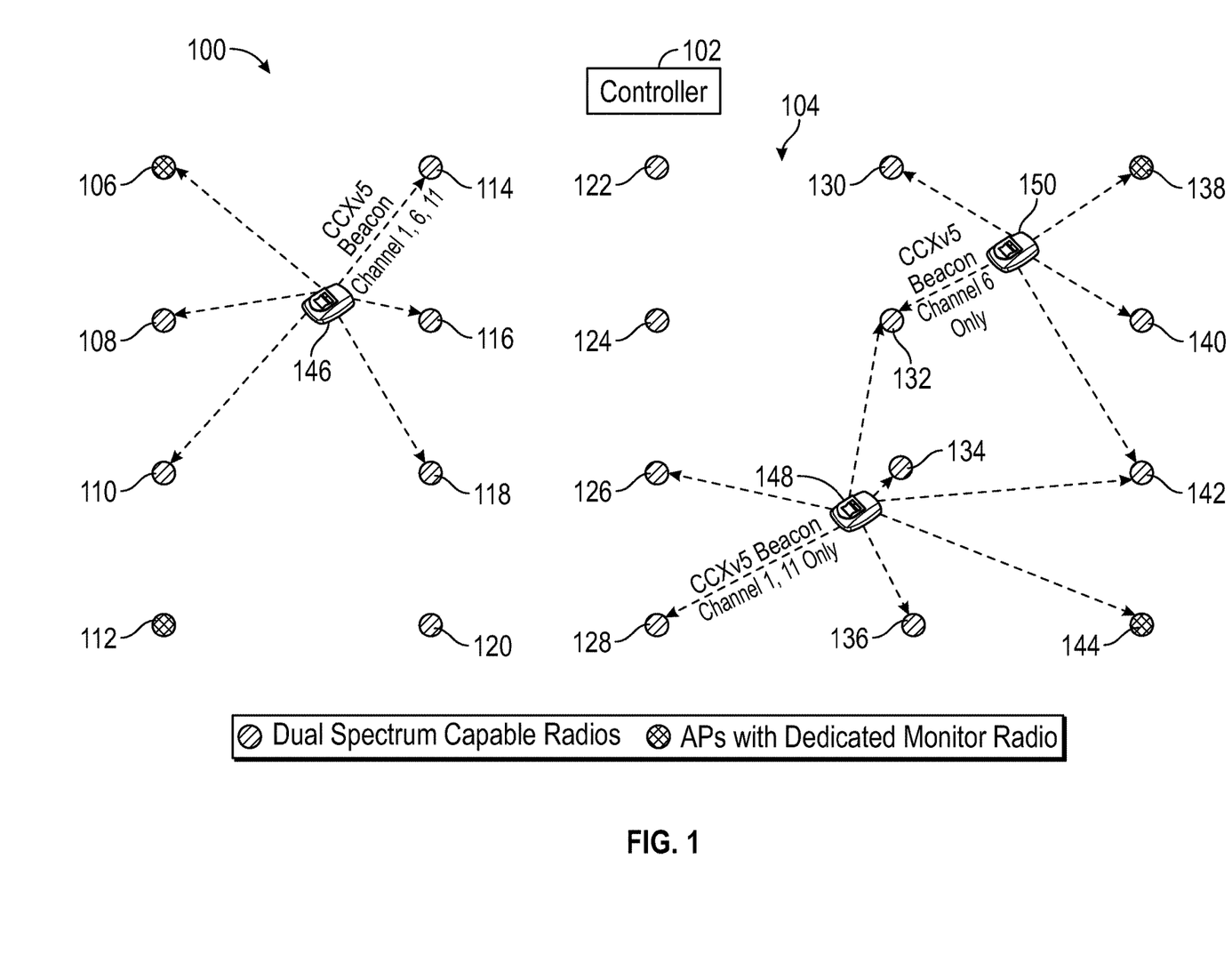
FIG. 1 is a block diagram of an operating environment for providing service cognizant radio role assignments.

FIG. 1 shows an operating environment 100 for providing service cognizant radio role assignments. As shown in FIG. 1, operating environment 100 may comprise a controller 102 and a coverage environment 104. Coverage environment 104 may comprise, but is not limited to, a Wireless Local Area Network (WLAN) comprising a plurality of Access Points (APs) that may provide wireless network access (e.g., access to the WLAN) for client devices. The plurality of APs may comprise a first AP 106, a second AP 108, a third AP 110, a fourth AP 112, a fifth AP 114, a sixth AP 116, a seventh AP 118, an eighth AP 120, a ninth AP 122, a tenth AP 124, an eleventh AP 126, a twelfth AP 128, a thirteenth AP 130, a fourteenth AP 132, a fifteenth AP 134, a sixteenth AP 136, a seventeenth AP 138, an eighteenth AP 140, a nineteenth AP 142, and a twentieth AP 144. As shown in FIG. 1 for example, first AP 106, fourth AP 112, seventeenth AP 138, and twentieth AP 144 may comprise APs with dedicated monitor radios for monitoring tags. The remaining APs may comprise dual spectrum capable radios for example.

The plurality of APs may provide wireless network access to a plurality of client devices (not shown) operated by a plurality of respective users as the plurality of client devices move within coverage environment 104. Ones of the plurality of client devices may comprise, but is not limited to, a smart phone, a personal computer, a tablet device, a mobile device, a telephone, a remote control device, a set-top box, a digital video recorder, an Internet-of-Things (IoT) device, a network computer, a router, or other similar microcomputer-based device. Each of the plurality of APs may be compatible with specification standards such as, but not limited to, the Institute of Electrical and Electronics Engineers (IEEE) 802.11ax specification standard for example.

Operating environment 100 may also include a plurality of tags. As shown in FIG. 1, the plurality of tags may comprise a first tag 146, a second tag 148, and a third tag 150 that may be monitored by radios in ones of the plurality of APs. The plurality of tags may comprise RTLS tags that may use electromagnetic fields (e.g., radio signals) to automatically identify the tags attached to objects. Each of the plurality of tags may include, but not limited to, a radio transponder, a radio receiver, and transmitter. When triggered or by its own volition, the tag may transmit data (e.g., a beacon message). This data may be used to track inventory goods, asset status, motion sensing, and chokepoint detection for example.

Controller 102 may comprise a Wireless Local Area Network controller (WLC) and may provision and control coverage environment 104 (e.g., a WLAN). Controller 102 may allow the plurality of client devices to join coverage environment 104. In some embodiments of the disclosure, controller 102 may be implemented by a Digital Network Architecture Center (DNAC) controller (i.e., a Software-Defined Network (SDN) controller) that may configure information for coverage environment 104 in order to provide service cognizant radio role assignments.

The elements described above of operating environment 100 (e.g., controller 102, first AP 106, second AP 108, third AP 110, fourth AP 112, fifth AP 114, sixth AP 116, seventh AP 118, eighth AP 120, ninth AP 122, tenth AP 124, eleventh AP 126, twelfth AP 128, thirteenth AP 130, fourteenth AP 132, fifteenth AP 134, sixteenth AP 136, seventeenth AP 138, eighteenth AP 140, nineteenth AP 142, and twentieth AP 144) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
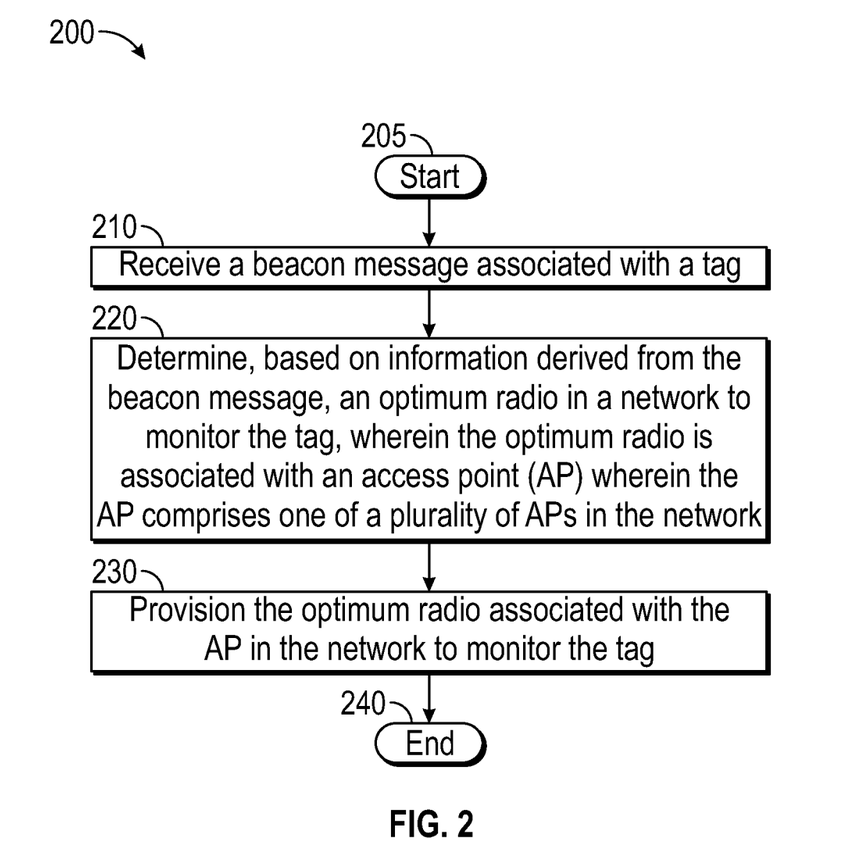
FIG. 2 is a flow chart of a method for providing service cognizant radio role assignments.

FIG. 2 is a flow chart setting forth the general stages involved in a method 200 consistent with an embodiment of the disclosure for providing service cognizant radio role assignments. Method 200 may be implemented using controller 102 as described in more detail above with respect to FIG. 1. Ways to implement the stages of method 200 will be described in greater detail below.

Method 200 may begin at starting block 205 and proceed to stage 210 where controller 102 may receive a beacon message associated with a tag. For example, an active tag (e.g., first tag 146, second tag 148, or third tag 150) may beacon (e.g., send a beacon message) to notify status of its asset for RTLS for any function described above. Using an off-channel scanning architecture, APs in operating environment 100 may operate in a promiscuous mode to gather Wi-Fi telemetry and off-channel packets from neighboring radios (i.e., in the APs) and clients. During the off-channel scan, the presence of an active tag may be detected based on an Information Element (IE) (e.g., a CCXv5 IE) embedded in its beacon message. The tag format may build upon a Wi-Fi "beaconing" tag process. This communication from Wi-Fi-based active tags may deliver location information and other data to the enabled APs. The beaconing process may not require tags to get associated with the APs and therefore may enable asset tracking to scale (e.g., to tens of thousands of tags) without negatively impacting the Wi-Fi network.

As shown in FIG. 1, first AP 106, second AP 108, third AP 110, fifth AP 114, sixth AP 116, and seventh AP 118 may respectively receive beacon messages associated with first tag 146. Eleventh AP 126, twelfth AP 128, fourteenth AP 132, fifteenth AP 134, sixteenth AP 136, ninetieth AP 142, and twentieth AP 144 may respectively receive beacon messages associated with second tag 148. Thirteenth AP 130, fourteenth AP 132, seventeenth AP 138, eighteenth AP 140, and ninetieth AP 142 may respectively receive beacon messages associated with third tag 150.

From stage 210, where controller 102 receives the beacon message associated with the tag, method 200 may advance to stage 220 where controller 102 may determine, based on information derived from the beacon message, an optimum radio in a network (i.e., coverage environment 104) to monitor the tag. The optimum radio may be associated with an AP that may comprise one of plurality of APs in the network. For example, once a beacon is processed, the presence of a tag may be identified and reported to a central controller entity (e.g., controller 102). The central controller entity, for example, may comprise a WLAN controller device or a control entity such as DNAC or control unit in a cloud.

The central control entity may amalgamate information from multiple radios in operating environment 100 to determine attributes comprising, for example, tag information, beaconing range, beaconing pattern, set of frequencies of operation, and programmability. Tag Information may include Wi-Fi spectrum compliance, tag capabilities such as low frequency receiver, chokepoint detection capabilities, etc. Behavior of the tags may be distinguished based on vendor and capabilities. This information may provide enhanced ability to perform tag classification on the central controller control entity to depict characteristics (e.g., the tags' beaconing behavior or range).

Beaconing range may enlist transmit power budget and range, for example, a given tag may support up to ~19 dBm transmit power on a single chain. This may be important to determine a set of neighboring APs that receive signals from a particular tag type. Beaconing pattern, for example, may comprise infrequent burst or scheduled. While active beaconing may enhance a tag's capability to support scale, an aggressive beaconing pattern may contribute to battery drain on a tag. Accordingly, various tags may support diverse beaconing techniques, while some tags may perform bursty beacon transmissions to maximize their reach to many APs in a single transmission. Other tags may perform more scheduled beaconing based, for example, on the RTLS requirements or type of asset policy/configurations.

Regarding set of frequencies of operation, tags may support universal frequencies in 2.4 GHz spectrum, however, particular types of tags may not conduct uniform beaconing across these frequencies and may have biased beaconing on a subset of the frequencies. This information may be utilized, for example, to determine optimized frequencies for beacon reception and amount of dwell on different set of channels.

With respect to programmability, tags may support a diverse set of configurations policies. Tag policies may include transmission interval, channel programmability, RTLS environmental parameters, and other environmental parameters.

Based on the above, embodiments of the disclosure may employ an AP monitoring classifier at the central controller entity, for example, that may determine a radio's monitoring capabilities and whether the presence of a dedicated monitor or multi-spectrum (XOR) is there. These factors may add bias in candidate determination for tags monitoring services.

Embodiment of the disclosure may analyze the above characteristics and may determine an optimal set of radios for tag monitoring service along with its scheduler. This may allow most of the APs to ignore monitoring of the tags, thus allowing greater efficiency. An AP may support either dedicated monitor role functions (e.g., modules, or integrated RHL) and based on the beaconing process, set of frequencies for transmissions, and transmission range, a set of radios may be determined to perform tag monitoring.

With other embodiments, AP where a dedicated monitor radio may not be available or their integrated monitor mode radios are optimized for other set of services which cannot facilitate larger dwells and scan requirements for tag monitoring, other processes may perform candidate radio selection for monitoring services. In this embodiment, for example, client serving radios identified as excessive may bias operation towards 2.4 GHz monitoring based on the dwell requirements and set of frequencies needed for scan. In the event, a tag may be monitored by multiple set of APs, built-in monitor capable radios may have higher bias for candidate selection.

Figure 3:
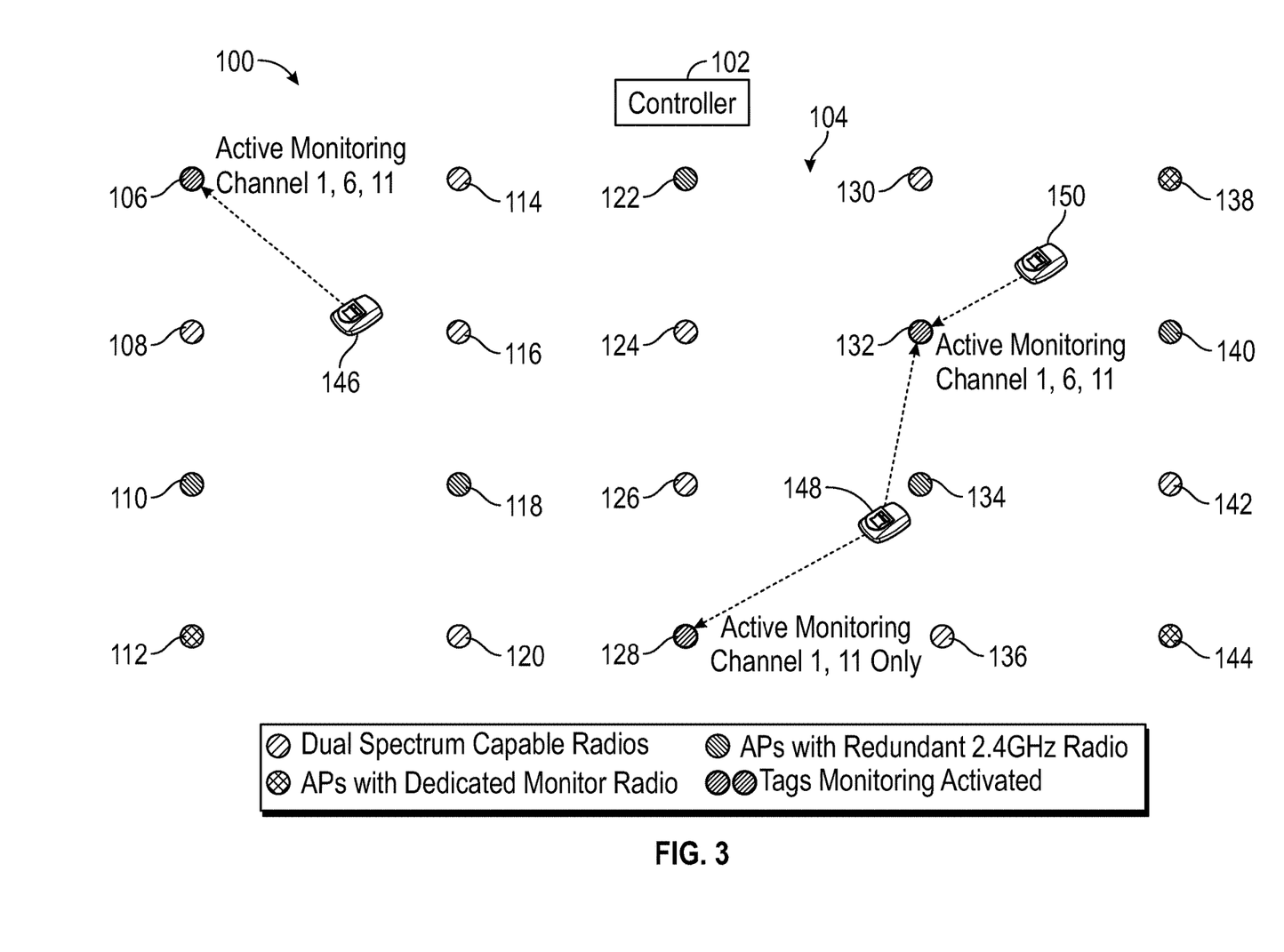
FIG. 3 is a block diagram of an operating environment for providing service cognizant radio role assignments.

With other embodiments, based on the proximity and range of a tag, a single radio capable of 2.4 GHz monitor may optimize its scheduler to perform multi-channel dwell for separate tags. As shown in FIG. 3, first tag 146 may perform beaconing on channel 1, 6, and 11 where second tag 148 may only beacon on channel 1 and 11. A similar beaconing internal may be used on both tags. Given first tag 146's and second tag 148's range, a radio capable of 2.4 GHz monitor may optimize a schedule to conduct higher dwells on channel 1 and 11 and standard dwell on channel 6 for example.

In yet another embodiments, a group of radios may be combined together to monitor a single tag if beaconing characteristics are infrequent and bursty. As shown in FIG. 3, if a tag (e.g., second tag 148) has infrequent and bursty beaconing performed in order to maximize beacon reception, if multiple sets of radios (e.g., in twelfth AP 128 and fourteenth AP 132) are available for monitor functions, they can perform interleaved scans to increase overall dwell on a specific channels. Similar operation may be done for asset tracking tags and/or RTLS requirements.

Once controller 102 determines, based on the information derived from the beacon message, the optimum radio in the network to monitor the tag in stage 220, method 200 may continue to stage 230 where controller 102 may provision the optimum radio associated with the AP in the network to monitor the tag. For example, embodiments of the disclosure may provision an optimal number of radios that may ensure no-loss in beacon measurements from the active tags. This may include radio capability, active role, and other pending service requests enqueued. As shown in FIG. 3, third AP 110, seventh AP 118, ninth AP 122, twelfth AP 128, fourteenth AP 132, fifteenth AP 134, and eighteenth AP 140, may be determined to have redundant 2.4 GHz radios. Based on the above analysis, a radio in first AP 106 may be provisioned to monitor first tag 146. Radios in twelfth AP 128 and fourteenth AP 132 may be provisioned to monitor second tag 148. A radio in fourteenth AP 132 may be provisioned to monitor third tag 150. Once controller 102 provisions the optimum radio associated with the AP in the network to monitor the tag in stage 230, method 200 may then end at stage 240.

Figure 4:
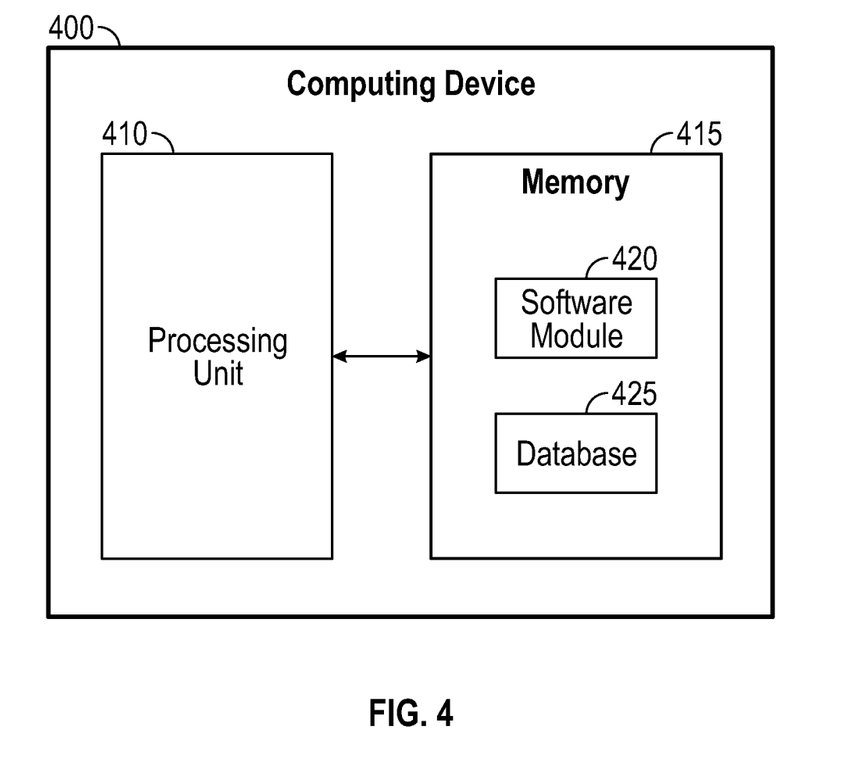
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing service cognizant radio role assignments as described above with respect to FIG. 2. Computing device 400, for example, may provide an operating environment for controller 102, first AP 106, second AP 108, third AP 110, fourth AP 112, fifth AP 114, sixth AP 116, seventh AP 118, eighth AP 120, ninth AP 122, tenth AP 124, eleventh AP 126, twelfth AP 128, thirteenth AP 130, fourteenth AP 132, fifteenth AP 134, sixteenth AP 136, seventeenth AP 138, eighteenth AP 140, nineteenth AP 142, or twentieth AP 144. Controller 102, first AP 106, second AP 108, third AP 110, fourth AP 112, fifth AP 114, sixth AP 116, seventh AP 118, eighth AP 120, ninth AP 122, tenth AP 124, eleventh AP 126, twelfth AP 128, thirteenth AP 130, fourteenth AP 132, fifteenth AP 134, sixteenth AP 136, seventeenth AP 138, eighteenth AP 140, nineteenth AP 142, or twentieth AP 144 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a computing device, a beacon message associated with a tag;
   determining, based on information derived from the beacon message, an optimum radio in a network to monitor the tag, wherein determining the optimum radio in the network to monitor the tag comprises:
   determining radio monitoring capabilities of each of a plurality of Access Points (APs) in the network, wherein determining the radio monitoring capabilities comprises determining whether a dedicated monitor radio is present and whether a dual band radio is present, and
   determining, based on the radio monitoring capabilities of each of the plurality of APs and the information derived from the beacon message, the optimum radio that is associated with an AP wherein the AP comprises one of the plurality of APs in the network, wherein remaining APs of the plurality of APs in the network ignore monitoring of the tag; and
   provisioning the optimum radio associated with the AP in the network to monitor the tag.

2. The method of claim 1, wherein determining the optimum radio comprises considering monitoring capabilities of radios in the plurality of APs.

3. The method of claim 1, wherein the information derived from the beacon message comprises tag information.

4. The method of claim 1, wherein the information derived from the beacon message comprises beaconing range of the tag.

5. The method of claim 1, wherein the information derived from the beacon message comprises beaconing pattern of the tag.

6. The method of claim 1, wherein the information derived from the beacon message comprises a set of frequencies of operation of the tag.

7. The method of claim 1, wherein the information derived from the beacon message comprises a programmability of the tag.

8. A system comprising:
a memory storage; and
a processing unit, the processing unit coupled to the memory storage, wherein the processing unit is operative to:
receive a beacon message associated with a tag,
determine, based on information derived from the beacon message, an optimum radio in a network to monitor the tag, wherein the processing unit being operative to determine the optimum radio in the network to monitor the tag comprises the processing unit being operative to:
determine radio monitoring capabilities of each of a plurality of Access Points (APs) in the network, wherein the processing unit being operative to determine the radio monitoring capabilities comprises the processing unit being operative to determine whether a dedicated monitor radio is present and whether a dual band radio is present, and
determine, based on the radio monitoring capabilities of each of the plurality of APs and the information derived from the beacon message, the optimum radio that is associated with an AP wherein the AP comprises one of the plurality of APs in the network, wherein remaining APs of the plurality of APs in the network ignore monitoring of the tag, and
provision the optimum radio associated with the AP in the network to monitor the tag.

9. The system of claim 8, wherein the processing unit being operative to determine the optimum radio comprises the processing unit being operative to consider monitoring capabilities of radios in the plurality of APs.

10. The system of claim 8, wherein the information derived from the beacon message comprises tag information.

11. The system of claim 8, wherein the information derived from the beacon message comprises beaconing range of the tag.

12. The system of claim 8, wherein the information derived from the beacon message comprises beaconing pattern of the tag.

13. The system of claim 8, wherein the information derived from the beacon message comprises a set of frequencies of operation of the tag.

14. The system of claim 8, wherein the information derived from the beacon message comprises a programmability of the tag.

15. A non-transitory computer-readable medium that stores a set of instructions which when executed perform a method executed by the set of instructions comprising:
receiving a beacon message associated with a tag;
determining, based on information derived from the beacon message, an optimum radio in a network to monitor the tag, wherein determining the optimum radio in the network to monitor the tag comprises:
determining radio monitoring capabilities of each of a plurality of Access Points (APs) in the network, wherein determining the radio monitoring capabilities comprises determining whether a dedicated monitor radio is present and whether a dual band radio is present, and
determining, based on the radio monitoring capabilities of each of the plurality of APs and the information derived from the beacon message, the optimum radio that is associated with an AP wherein the AP comprises one of the plurality of APs in the network, wherein remaining APs of the plurality of APs in the network ignore monitoring of the tag; and
provisioning the optimum radio associated with the AP in the network to monitor the tag.

16. The non-transitory computer-readable medium of claim 15, wherein determining the optimum radio comprises considering monitoring capabilities of radios in the plurality of APs.

17. The non-transitory computer-readable medium of claim 15, wherein the information derived from the beacon message comprises tag information.

18. The non-transitory computer-readable medium of claim 15, wherein the information derived from the beacon message comprises beaconing range of the tag.

19. The non-transitory computer-readable medium of claim 15, wherein the information derived from the beacon message comprises beaconing pattern of the tag.

20. The non-transitory computer-readable medium of claim 15, wherein the information derived from the beacon message comprises a set of frequencies of operation of the tag.

* * * * *